(12) United States Patent
Wildman

(10) Patent No.: US 8,292,236 B2
(45) Date of Patent: Oct. 23, 2012

(54) FLIGHT SURFACE SEAL

(75) Inventor: Eric Wildman, Bristol (GB)

(73) Assignee: Airbus Operations Limited, Bristol (GB)

( * ) Notice: Subject to any disclaimer, the term of this patent is extended or adjusted under 35 U.S.C. 154(b) by 608 days.

(21) Appl. No.: 12/382,472

(22) Filed: Mar. 17, 2009

(65) Prior Publication Data

US 2009/0267304 A1 Oct. 29, 2009

(30) Foreign Application Priority Data

Apr. 23, 2008 (GB) .................................. 0807395.9

(51) Int. Cl.
*B64C 9/14* (2006.01)
*B64C 1/14* (2006.01)

(52) U.S. Cl. ........................................ 244/216; 244/130

(58) Field of Classification Search .................. 244/212, 244/213, 214, 215, 216, 217, 130, 198, 131
See application file for complete search history.

(56) References Cited

U.S. PATENT DOCUMENTS

| | | | | | |
|---|---|---|---|---|---|
| 2,152,029 | A | * | 3/1939 | Cone | 244/215 |
| 2,461,745 | A | * | 2/1949 | Lang | 244/130 |
| 2,932,473 | A | * | 4/1960 | Kass et al. | 244/90 R |
| 3,655,149 | A | * | 4/1972 | Williams | 244/225 |
| 4,213,587 | A | * | 7/1980 | Roeseler et al. | 244/213 |
| 4,290,612 | A | * | 9/1981 | Frosch et al. | 277/345 |
| 4,335,671 | A | * | 6/1982 | Warner et al. | 114/274 |
| 4,470,366 | A | * | 9/1984 | Williams | 114/280 |
| 4,575,030 | A | * | 3/1986 | Gratzer | 244/209 |
| 4,577,579 | A | * | 3/1986 | Williams | 114/274 |
| 5,065,960 | A | * | 11/1991 | Castellucci | 244/131 |
| 5,071,092 | A | * | 12/1991 | Williams et al. | 244/129.1 |
| 5,622,336 | A | * | 4/1997 | Chavanne et al. | 244/129.1 |
| 5,794,893 | A | * | 8/1998 | Diller et al. | 246/213 |
| 5,915,653 | A | * | 6/1999 | Koppelman | 244/129.1 |
| 6,145,791 | A | * | 11/2000 | Diller et al. | 244/215 |
| 6,173,924 | B1 | * | 1/2001 | Young et al. | 244/215 |
| 6,575,407 | B2 | * | 6/2003 | McCallum et al. | 244/133 |
| 7,051,982 | B1 | * | 5/2006 | Johnson | 244/215 |
| 7,546,984 | B2 | * | 6/2009 | Poppe et al. | 244/215 |
| 7,631,840 | B2 | * | 12/2009 | Kallinen et al. | 244/213 |
| 2006/0022093 | A1 | * | 2/2006 | Poppe et al. | 244/215 |
| 2009/0072090 | A1 | * | 3/2009 | Kallinen et al. | 244/131 |

FOREIGN PATENT DOCUMENTS

| | | |
|---|---|---|
| DE | 19716164 | 10/1998 |
| EP | 0 420 758 | 4/1991 |
| EP | 0 782 955 | 7/1997 |
| EP | 1 686 056 | 8/2006 |

(Continued)

OTHER PUBLICATIONS

Great Britain Search Report for GB Application No. 0807395.9, dated Aug. 4, 2008.

*Primary Examiner* — Benjamin P Lee
(74) *Attorney, Agent, or Firm* — Nixon & Vanderhye, P.C.

(57) ABSTRACT

A seal for sealing a gap between a first (252) and a second (207) component of an aircraft flight surface which has a first seal body (222) having a first sealing portion (246) arranged to seal against the first component, wherein the first seal body is movably mounted to the second component so as to seal at least part of the gap during relative movement of the first and second components. A seal is also provided with components movable relative to each other.

12 Claims, 8 Drawing Sheets

FOREIGN PATENT DOCUMENTS

| | | |
|---|---|---|
| GB | 488986 | 4/1938 |
| GB | 748094 | 4/1956 |
| GB | 2 235 169 | 2/1991 |
| GB | 2 323 576 | 9/1998 |
| GB | 2 409 039 | 5/2005 |
| JP | 2003-592 | 1/2003 |
| WO | 02/086474 | 10/2002 |

* cited by examiner

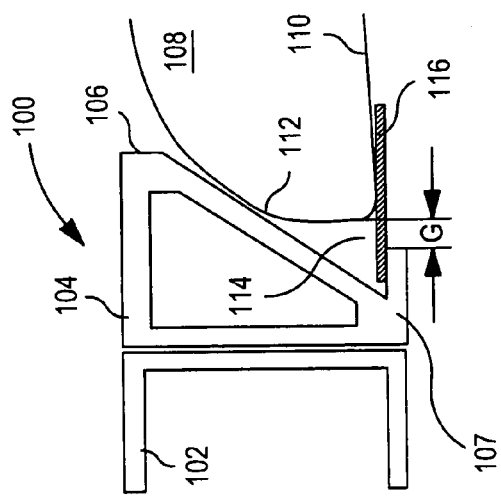
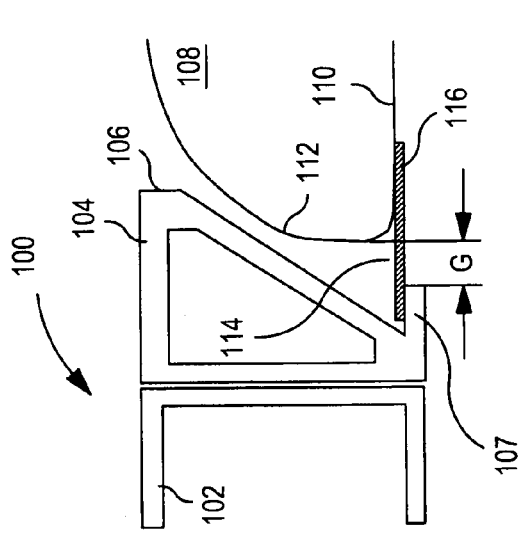
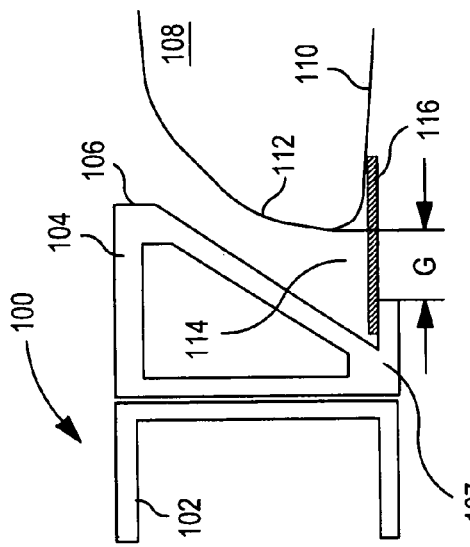

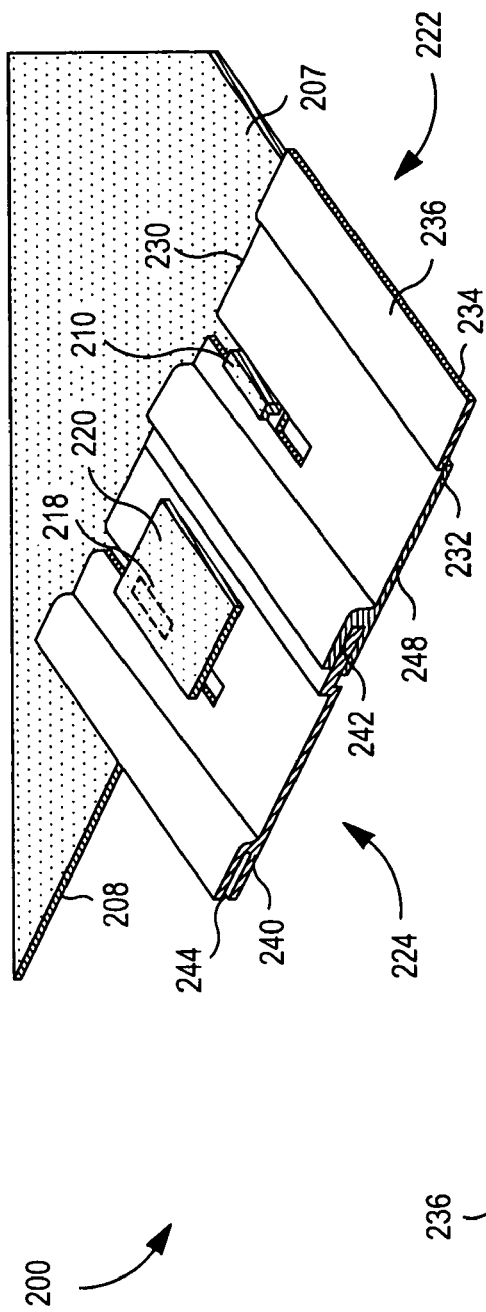
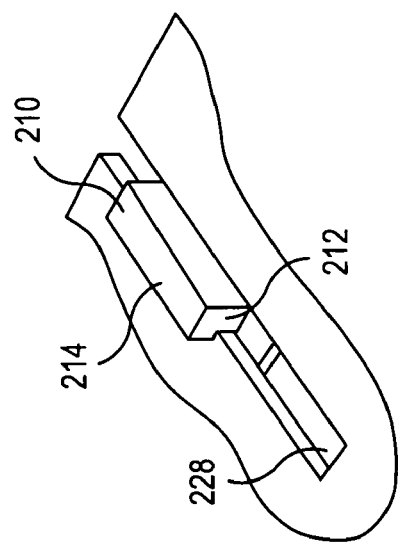
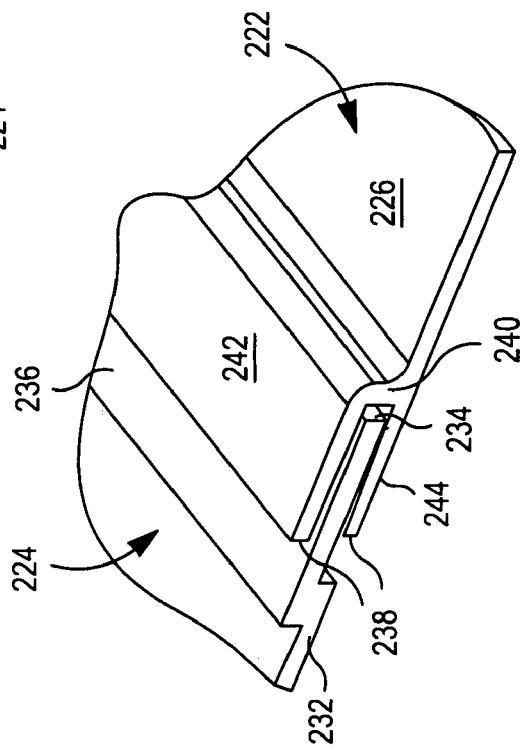

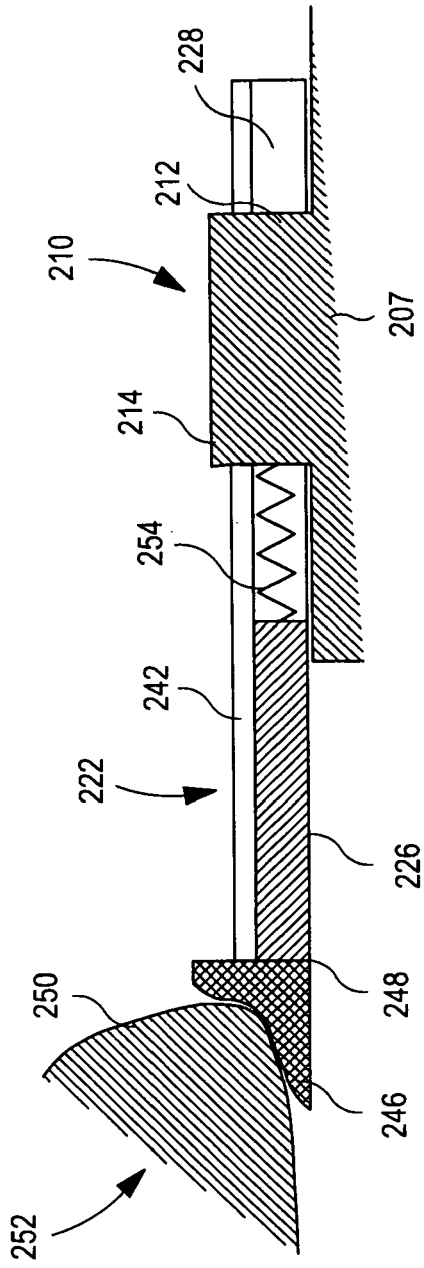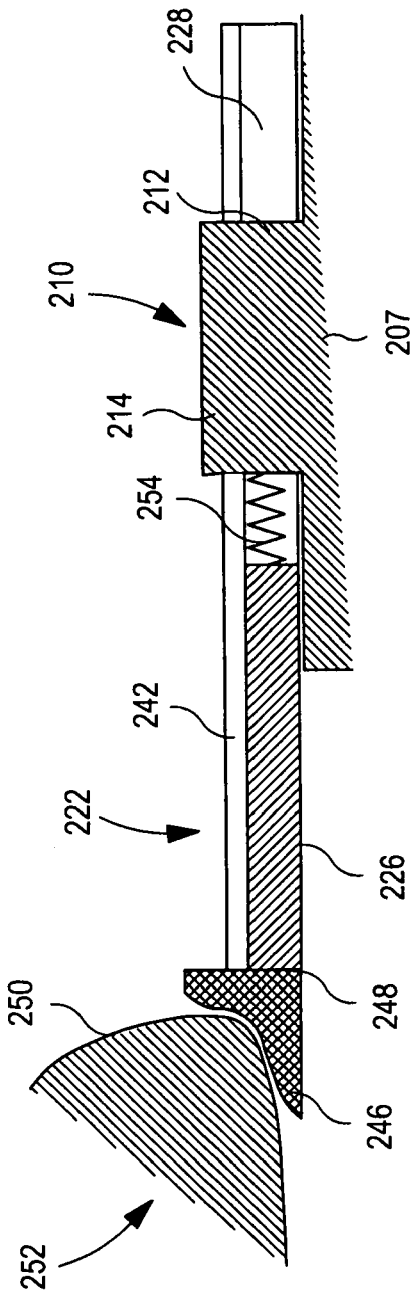
FIG. 7
FIG. 8

US 8,292,236 B2

FLIGHT SURFACE SEAL

This application claims priority to Great Britain Application No. 0807395.9, filed 23 Apr. 2008, the entire contents of which is hereby incorporated by reference.

FIELD OF THE INVENTION

The present invention is concerned with a flight surface seal. More particularly, the present invention is concerned with a seal positioned between two control surface components of an aircraft to seal a variable gap therebetween.

BACKGROUND OF THE INVENTION

In aerospace design it is desirable to seal any gaps between components of flight surfaces to present a smooth surface to the passing airflow. This reduces losses and prevents undesirable fluid flow effects such as separation of the boundary layer and subsequent loss of lift.

Components of aircraft flight surfaces such as wings, tail planes, fins, landing gear doors and control surfaces (e.g. flaps, slats, rudders, ailerons and spoilers) tend to move in use both intentionally in response to a control input (in the case of control surfaces) and unintentionally due to thermal expansion and contraction and stresses experienced in use.

As such, the width of the gaps to be sealed between components varies depending on the relative position of the components. Known seal technology utilises resilient seals which are mounted to a first component to seal against a second adjacent component and resiliently deform to the seal gap as it varies.

Such gap width variation is observed between variable camber flaps at the trailing edge of aircraft wings. The gap width between the wing and the flap not only changes due to control input, but also changes as the wing and flap thermally expand and contract with variations in operating temperature and during the flight cycle during which a range of stresses are experienced.

Furthermore, the gap width can vary along the length of the gap itself (i.e. along the wing span).

Traditionally, such gaps are sealed with the use of unitary flexible seals mounted to a first component and abutting a second component to seal against it and thereby seal the gap. These seals need to be sufficiently flexible and resilient to maintain the sealing effect during changes in the gap width but stiff enough to prevent significant deformation under the action of the air passing over the flight surface in flight.

A problem with such seals is that the requirements of flexibility to account for changes in gap width and stiffness to prevent deformation under fluid loading are counteractive. As such, it is difficult to design a seal that will fulfill both requirements.

Furthermore, variations in seal gap along the wing span are difficult to seal effectively as unitary seals are often too laterally stiff to account for these changes.

Also, seals are common in which the second component slides over a seal surface. As such there needs to be a seal flange of significant width (at least as wide as the maximum gap width) which inherently decreases the structural stiffness of the seal.

It is an aim of the present invention to overcome or at least mitigate one or more of the above problems.

SUMMARY OF THE INVENTION

According to a first aspect of the invention there is provided a seal for sealing a gap between a first and a second component of an aircraft flight surface comprising a first seal body having a first sealing portion arranged to seal against the first component, wherein the first seal body is movably mounted to the second component so as to seal at least part of the gap during relative movement of the first and second components.

In this manner, the sealing portion provides the sealing functionality and can be as flexible as required, whereas the movably mounted seal body can provide the required stiffness and range of motion without the requirement for sliding.

According to a second aspect of the invention there is provided a seal for sealing a gap between a first and a second component of an aircraft flight surface comprising a first seal body having a first sealing portion arranged to seal against the first component, and a second seal body having a second sealing portion arranged to seal against one of the first and second components, wherein the first and second seal bodies are mounted so as to be movable relative to each other.

BRIEF DESCRIPTION OF THE DRAWINGS

Embodiments of the invention will now be described with reference to the accompanying drawings in which:

FIG. 1 is a side schematic view of a part of an aircraft wing in a first configuration, FIG. 2 is a side schematic view of a part of the aircraft wing of FIG. 1 in a second configuration, FIG. 3 is a side schematic view of a part of the aircraft wing of FIG. 1 in a third configuration, FIG. 4 is a perspective view of a part of a seal arrangement in accordance with the present invention, FIG. 5 is a perspective detail view of a part of the seal arrangement of FIG. 4, FIG. 6 is a perspective detail view of a part of the seal arrangement of FIG. 4, FIG. 7 is a side section view of a part of the seal arrangement of FIG. 4 in a first configuration, FIG. 8 is a side section view of a part of the seal arrangement of FIG. 4 in a second configuration.

DETAILED DESCRIPTION OF THE EMBODIMENTS

Figure 9:
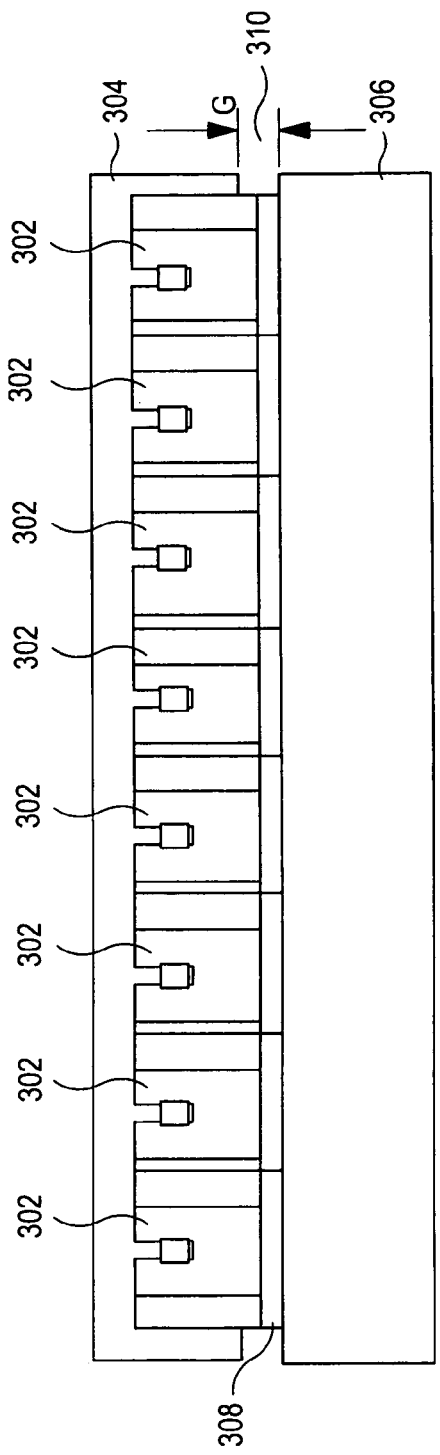
FIG. 9 is a plan view of a part of the seal arrangement of FIG. 4 in the configuration of FIG. 7.

Referring to FIGS. 1 to 3, a wing 100 is shown and oriented with a direction of travel D. As such, components of the wing 100 have a leading edge in direction L and a trailing edge in a direction T.

The wing 100 comprises a wing spar section 102 and a spoiler hinge rib 104 for mounting a spoiler (not shown) at the wing trailing edge 106. The wing also comprises a lower flange 107. The wing 100 comprises a flap 108 for varying the camber of the wing 100. The flap 108 defines a lower surface 110 and a flap leading edge 112.

A gap 114 of width G is defined between the foremost part of the flap leading edge 112 and the rearmost part of the flange 108.

The flap 108 can be controlled by a control actuator (not shown) to vary the camber of the wing. As such the flap 108 can move between a nominal, 0 degree position (FIG. 1), a −2 degree position (FIG. 2) and a +4 degree position (FIG. 3). As the flap 108 moves between these positions the width G of the gap 114 changes.

The gap G can be sealed by means of a unitary flexible sealing element 116 which is attached to the flange 107 and cantilevered to extend towards the flap 108. The sealing element 116 seals against the flap lower surface 110 and as the flap 108 moves the lower surface 110 slides along the sealing element 116.

Flexible unitary sealing elements such as element 116 may exhibit the problems described in the introduction.

Turning to FIG. 4, a seal arrangement 200 is shown mounted to a flange 207, similar in position within a wing assembly to the flange 107. The flange 207 has a trailing edge 208 which defines one side of the gap (not shown) between it and a flap (not shown).

The flange 207 comprises a first protrusion 210 having an upright portion 212 and a flange 214 extending therefrom, better seen in FIG. 6. The flange 207 comprises a second protrusion 216 comprising an upright portion 218 and a plate 220 extending therefrom. The first protrusion 210 and the second protrusion 216 are alternative formations and need not necessarily be used in conjunction, although this is possible.

The seal arrangement 200 comprises a first seal plate 222 and a second seal plate 224. The seal plates 222, 224 are identical and as such the only seal plate 222 will be described in detail.

The first seal plate 222 comprises a plate 226 defining an elongate slot 228 extending from a leading edge 230 thereof. The first seal plate 222 comprises a step formation 232 proximate a first side edge 234 adjacent the leading edge 230. The first step formation 232 is connected to a male mating flange 236, parallel to the plate 226 and defining the first side edge 234.

Opposite to the first side edge 234 is a second side edge 238. Proximate the second side edge 238 there is a second step formation 240 leading to a female top mating flange 242. Furthermore the plate 226 extends beyond the second step formation 240 to form a female mating formation 244.

The seal arrangement 200 is assembled by sliding the first seal plate 222 into position such that the upright portion 212 of the first protrusion 210 extending from the flange 207 is received within the slot 228 of the plate 226, as shown in FIG. 6. The second seal plate can then be assembled to the flange 207 in the same manner, however the male mating flange 236 of the second seal plate 224 is received and slidable in the female mating formation 244 of the first seal plate 222.

It should be noted that the flange 214 of the first protrusion 210 and the plate 220 of the second protrusion 216 retain the seal plates 222, 224 adjacent the flange 207.

Further details of the seal arrangement 200 will be described with reference to FIGS. 7 and 8.

As shown in FIGS. 7 and 8 the first seal plate 222 comprises a seal element 246 at its trailing edge 248. The seal element 246 is constructed from a flexible sealing material (e.g. rubber) and is shaped to receive a leading edge 250 of an aircraft flap 252.

Additionally, the first seal plate 222 comprises a spring 254 disposed between the upright portion 212 of the first protrusion 210 and the end of the slot 228. In use, the first seal plate 222 is able to move relative to the flange 207. As the flap 252 approaches the flange 207 the abutment between the seal element 246 and the leading edge 250 causes the first seal plate to move relative to the flange 207 and compress the spring 254. As the flap 252 moves away from the flange 207 the spring acts to urge the first seal plate 222 against the leading edge 250 to maintain contact and ensure that the gap between the leading edge 250 and the trailing end of the flange 207 is sealed.

As will be noted, the amount of sliding between the seal element 246 and the leading edge 250 of the flap 252 is reduced compared to the sealing element 116.

Turning to FIG. 9, a seal arrangement 300 is shown comprising a plurality of seal plates 302, each identical to the seal plate 222. Each seal plate has a seal element 308 mounted to the trailing edge thereof. The seal plates 302 are mounted to the trailing edge of a flange 304 of a wing of an aircraft (not shown). The seal plates act to seal a gap 310 of width G between the flange 304 and a flap 306.

Figure 10:
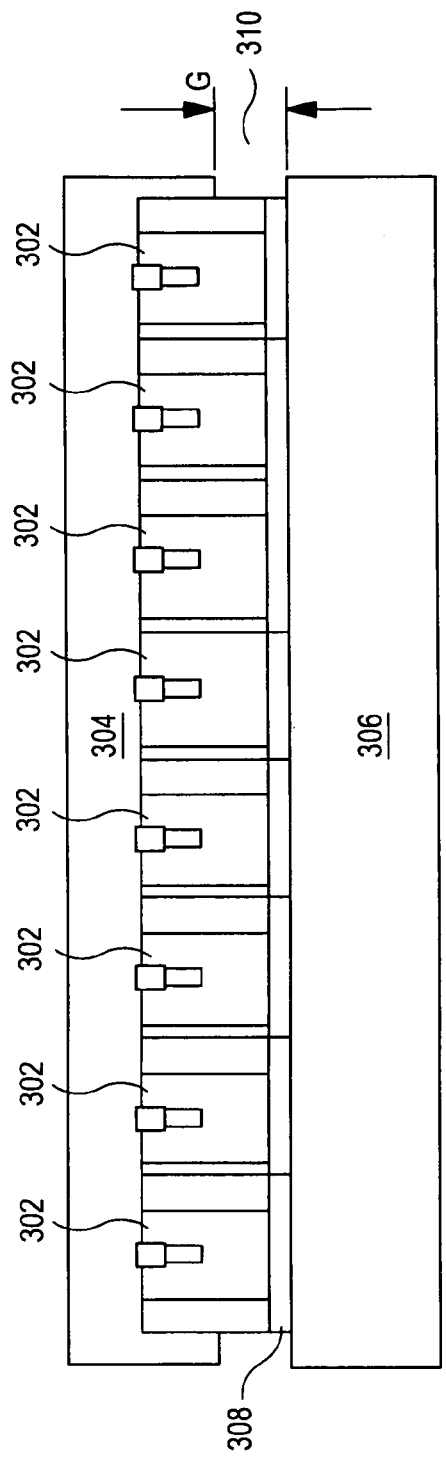
FIG. 10 is a plan view of a part of the seal arrangement of FIG. 4 in the configuration of FIG. 8.

Comparing FIGS. 9 and 10, the flap 306 has been moved further away from the flange 304. As such the gap 310 has grown. Each of the seal plates 302 has moved to accommodate the change in gap width G.

Figure 11:
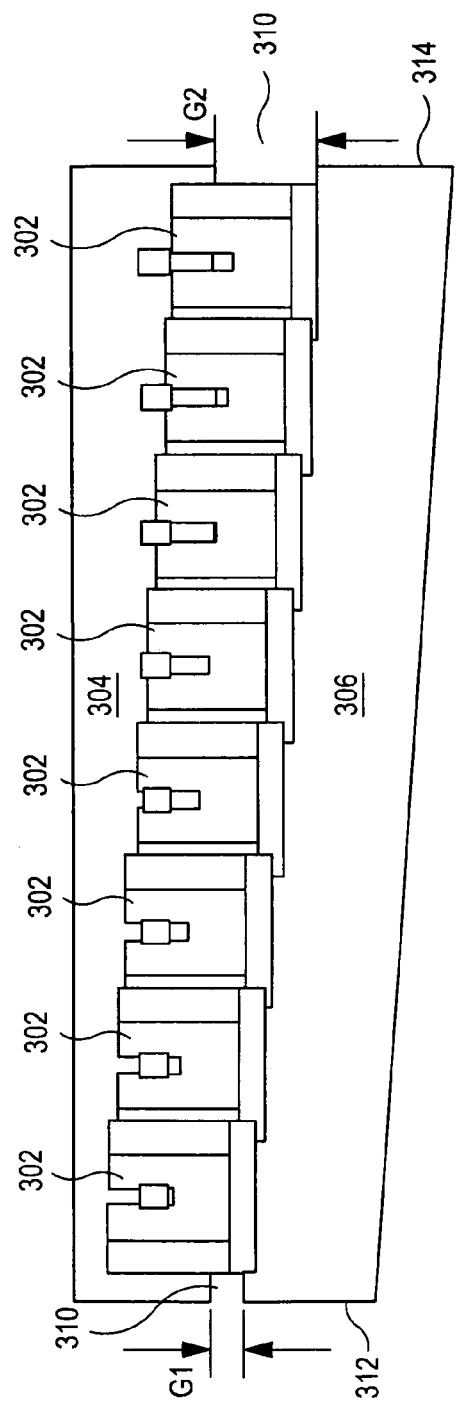
FIG. 11 is a plan view of a part of the seal arrangement of FIG. 4 in a third configuration.

Referring to FIG. 11, the gap width along the wing span is no longer consistent, and the width G1 at a first end 312 of the gap 310 is less than the width G2 at a second end 314. As can be seen, each of the seal plates 302 moves independently to seal the gap 310 across the span.

Figure 12:
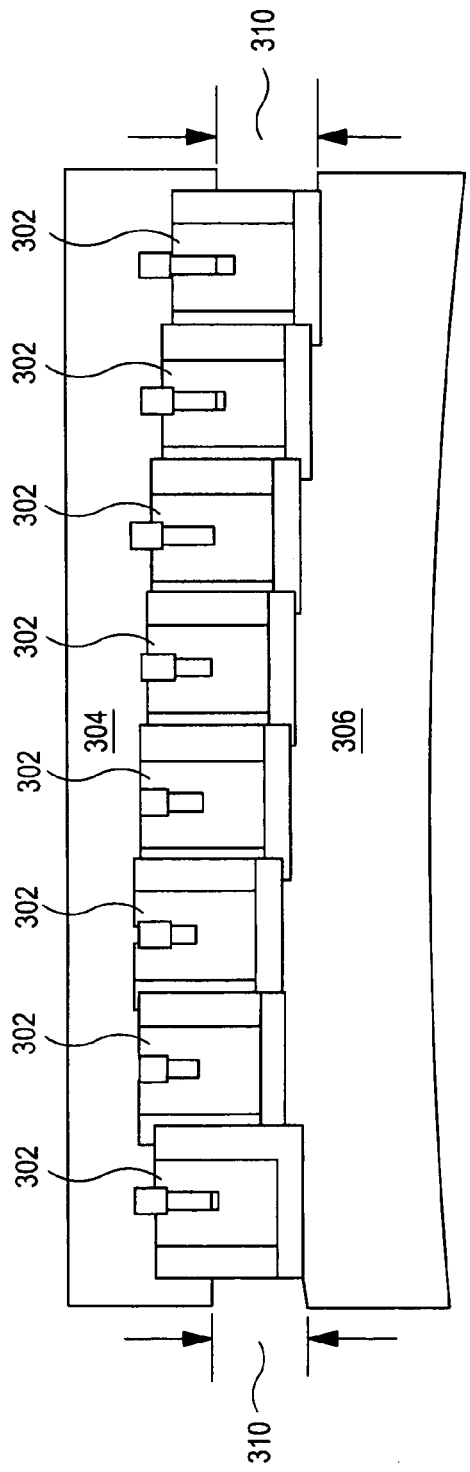
FIG. 12 is a plan view of a part of the seal arrangement of FIG. 4 in a fourth configuration.

Referring to FIG. 12, the gap width G also varies, but non-linearly and as can be observed, the seal plates 302 move relative to the flange 304 and each other to conform to the gap 310 and maintain sealing.

Figure 13:
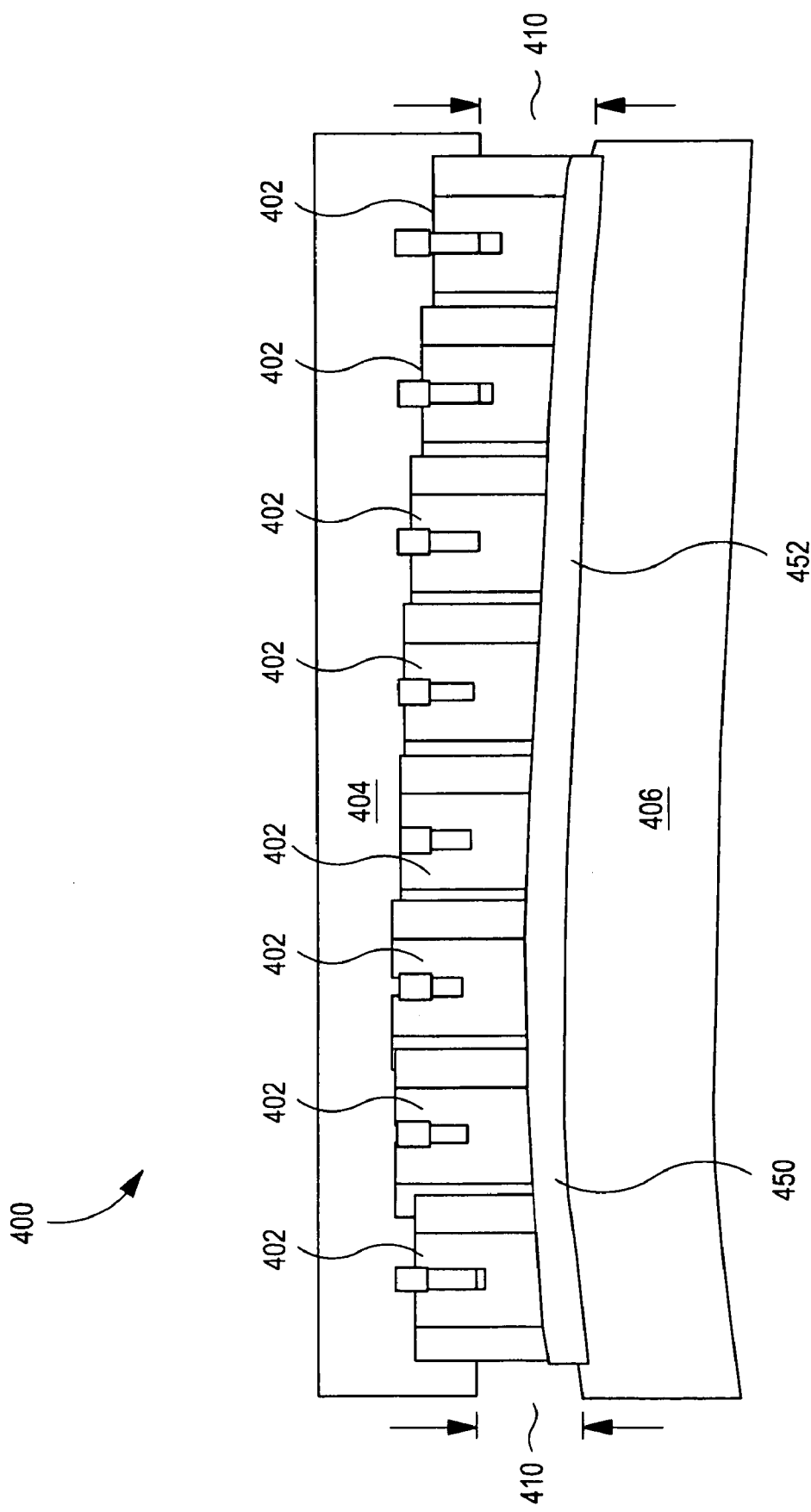
FIG. 13 is a plan view of a part of a second seal arrangement in accordance with the present invention.

FIG. 13 shows an alternative seal arrangement 400 similar to the seal arrangement 300 with reference numerals for common features 100 greater. Instead of individual sealing elements on each seal plate 302, the arrangement 400 features a single elongate sealing element 450 which spans the seal plates 402 and deforms as they move individually. In this way a continuous sealing edge 452 is provided against the flap 406.

Figure 14:
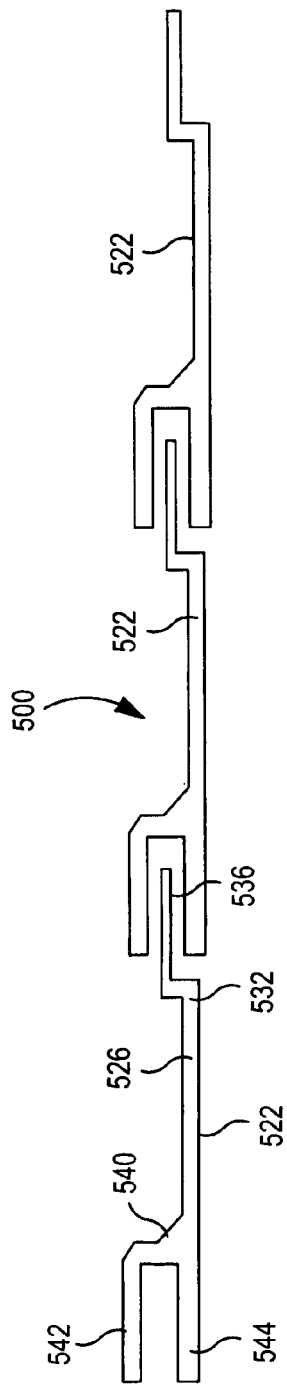
FIG. 14 is an end view of a third seal arrangement in accordance with the present invention in a first configuration.

Referring to FIG. 14, a seal arrangement 500 similar to the seal arrangement 200 is shown, with reference numerals of common features 300 greater. As can be seen, the female mating formation 544 defines a gap larger than the thickness of the male mating flange 536. As such, the individual seal plates 522 can rotate relative to each other as the flange to which they are mounted (not shown) bends in use.

Figure 15:
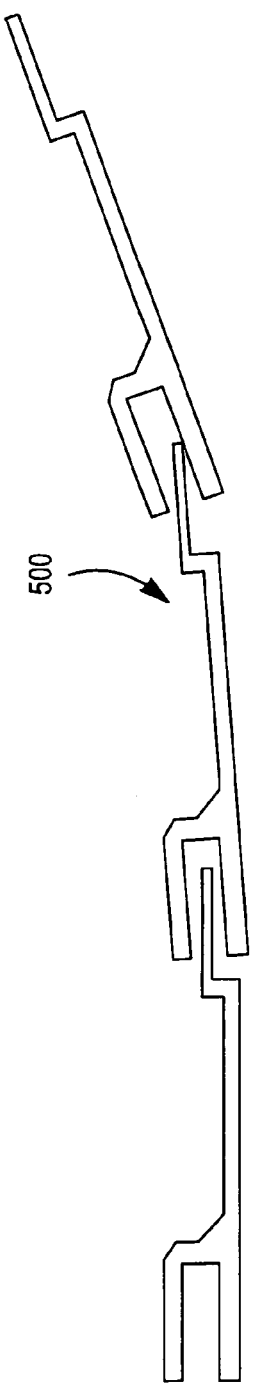
FIG. 15 is an end view of the seal arrangement of FIG. 14 in a second configuration.
Figure 16:
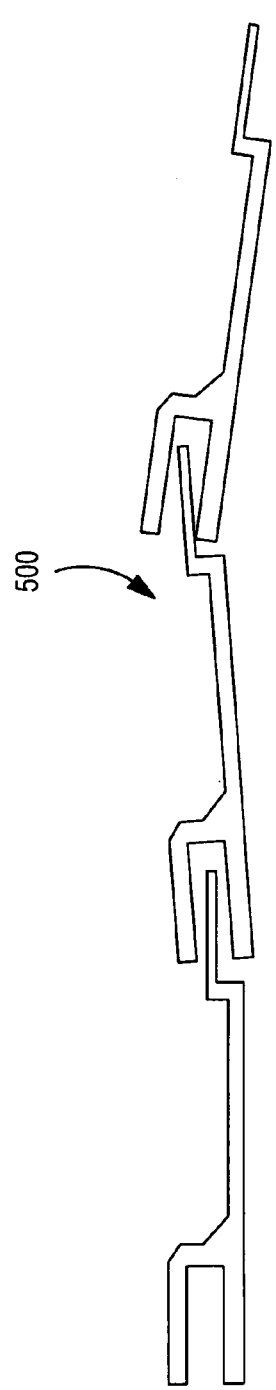
FIG. 16 is an end view of the seal arrangement of FIG. 14 in a third configuration.

FIGS. 15 and 16 show the seal arrangement 500 flexing as the flange (not shown) bends.

Figure 17:
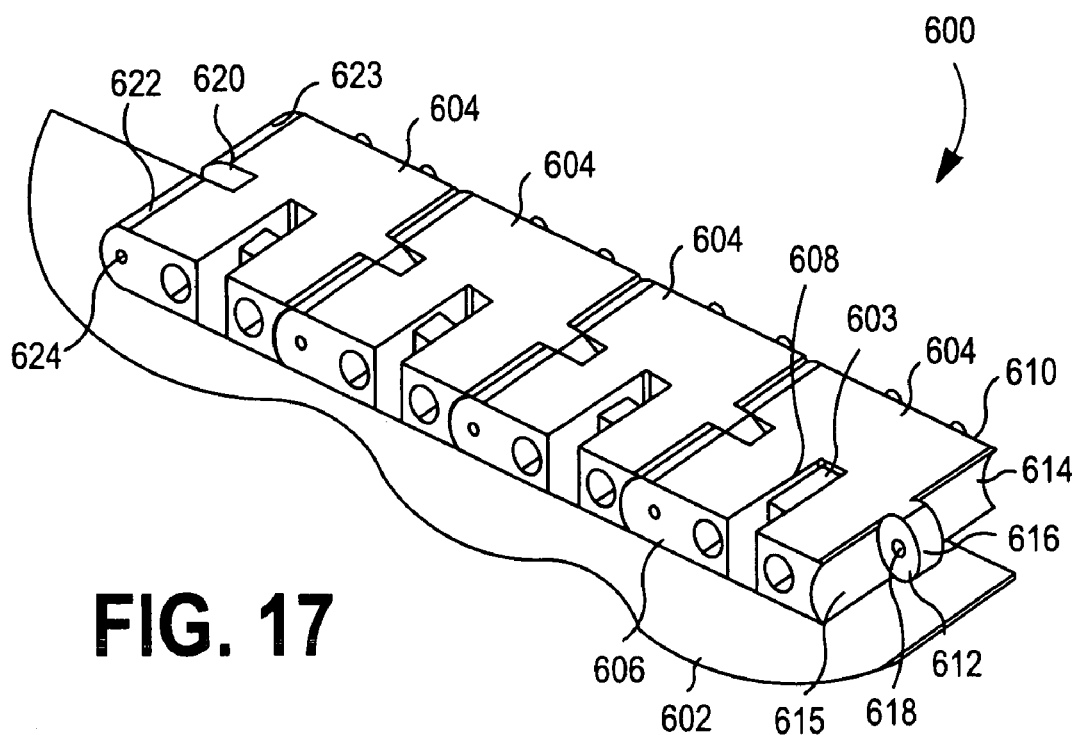
FIG. 17 is a perspective view of a fourth seal arrangement in accordance with the present invention.

Turning to FIG. 17, a seal arrangement 600 is shown mounted to a flange 602 of a flight surface component. The flange comprises a plurality of flange lugs 603 projecting therefrom. The seal arrangement 600 comprises a plurality of seal bodies 604. Each seal body 604 defines a leading edge 606 on which a slot 608 is formed extending towards a trailing edge 610.

The seal body 604 defines a lug 612 extending from a first side 614. The end of the first lug 612 opposite the seal body 604 is shaped as an arc 616. A circular bore 618 is defined at the centre of the arc 616. The first side 614 has a concave semi-cylindrical face 615.

The seal body 604 defines a slot 620 extending from a second side 622 towards the first side 614. The lug 612 and the slot 620 are at the same position along the first and second sides respectively. The second side 622 has a convex semi-cylindrical face 623. A bore 624 is defined at the centre of the convex semi-cylindrical face 623.

To assemble the seal arrangement 600, the lug 612 of one seal body is placed within the slot 620 of an adjacent seal body and the bores 618, 624 are aligned. A cylindrical shaft (not shown) is placed through the bores 618, 624 to provide a pinned joint between the adjacent seal bodies.

Figure 18:
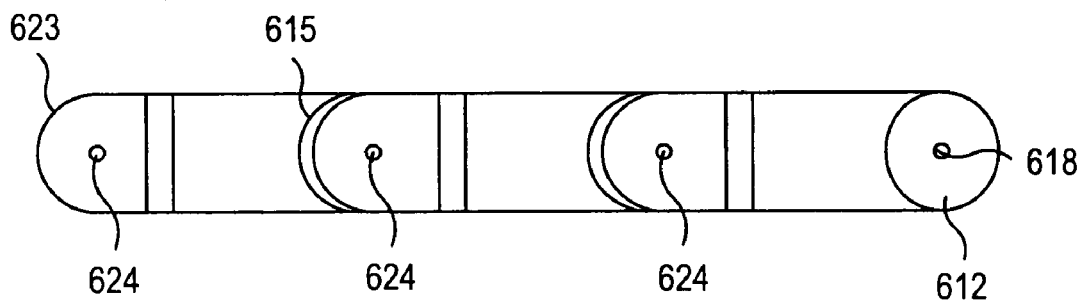
FIG. 18 is an end view of the seal arrangement of FIG. 17 in a first configuration, and, FIG. 19 is an end view of the seal arrangement of FIG. 17 in a second configuration.
Figure 19:
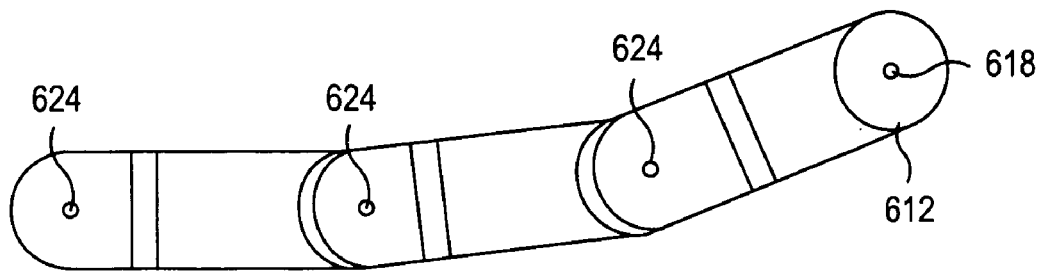

The seal bodies can then be mounted to the flange 602 via the flange lugs 603 which are inserted into the slots 608. In use, the seal arrangement can therefore flex as the flange 602 flexes, as shown in FIGS. 18 and 19. It should be noted that a sealing element (not shown) would be positioned along the trailing edge 610 of the seal arrangement 600.

Variations of the above examples fall within the scope of the present invention.

The seal arrangement may comprise a single elongate seal plate movably mounted to the flange.

The seal plate body may be manufactured from a stiff material (e.g. a composite or metal) and the seal element from a deformable sealing material e.g. rubber thus providing the required stiffness and sealing ability. Alternatively the entire seal plate may be constructed from reinforced rubber.

The seal element need not have an abutment formation to engage the flap—rather the seal plate could be urged by friction between a flat seal and the bottom of the flap which it seals against.

Preferably, the seal plates are mounted to the flange such that their travel is limited by way of a stop mechanism or abutment to prevent the seal plates from coming detached from the flange in use.

The invention claimed is:

1. A seal for sealing a gap in a flight surface between a first and a second component of an aircraft, said seal comprising;
   - a first seal body having a first sealing portion arranged to seal against the first component,
   - a second seal body having a second sealing portion arranged to seal against the first component,
   - wherein the first and second seal bodies are mounted so as to be movable relative to each other in a direction towards said first component, and,
   - wherein the first and second seal bodies are movably mounted to the second component so as to seal at least part of the flight surface gap during relative movement of the first and second components.

2. A seal according to claim 1 in which the first and second seal bodies are slideably mounted to the second component.

3. A seal according to claim 1 in which the first and second seal bodies are resiliently biased towards the first component.

4. A seal according to claim 1 in which the first and second bodies are slideably movable relative to each other in two perpendicular directions.

5. A seal according to claim 1 in which the second seal body is mounted to the first via a tongue and groove joint.

6. A seal according to claim 1 in which the first component is a flight control surface.

7. A seal according to claim 6 in which the flight control surface is a flap or slat and the second component is a component of an aircraft wing.

8. A seal according to claim 1 in which the first and second sealing portions are attached to each other.

9. A seal according to claim 1 in which the first and second sealing portions are unitary.

10. A seal according to claim 1 in which the seal body or bodies are mounted to the first or second component so as to limit their movement relative to the first or second component.

11. A seal for sealing a gap between a first and a second component of an aircraft flight surface, said seal comprising:
   - a first seal body having a first sealing portion arranged to seal against the first component,
   - a second seal body having a second sealing portion arranged to seal against the first component, wherein the first and second seal bodies are mounted so as to be movable relative to each other, the first and second seal bodies are movably mounted to the second component so as to seal at least part of the gap during relative movement of the first and second components, and the first and second sealing portions are unitary.

12. A seal for sealing a gap in a flight surface between a first and a second component of an aircraft, said seal comprising;
   - a first seal body having a first sealing portion arranged to seal against the first component,
   - a second seal body having a second sealing portion arranged to seal against the first component,
   - wherein the first and second seal bodies are configured to rotate relative to each other about an axis extending from the first component towards said second component, and wherein the first and second seal bodies are movably mounted to the second component so as to seal at least part of the flight surface gap during relative movement of the first and second components.

\* \* \* \* \*